United States Patent Office 3,424,745
Patented Jan. 28, 1969

3,424,745
NOVEL PROCESS FOR THE PREPARATION OF TRIENIC STEROID DERIVATIVES
Robert Joly, Montmorency, Julien Warnant, Neuilly-sur-Seine, Jean Jolly, Clichy-sous-Bois, Jacques Prost-Marechal, Paris, Robert Bucourt, Clichy-sous-Bois, and Jean Tessier, Paris, France, assignors to Roussel-UCLAF, Paris, France, a corporation of France
No Drawing. Filed May 24, 1965, Ser. No. 458,416
Claims priority, application France, May 27, 1964, 976,020; Nov. 5, 1964, 993,963; Feb. 26, 1965, 7,225; Mar. 18, 1965, 9,760
U.S. Cl. 260—239.5      15 Claims
Int. Cl. C07c *173/10, 169/34, 169/10*

ABSTRACT OF THE DISCLOSURE

The present invention relates to a new process for the preparation of $\Delta^{4,9,11}$-trienic steroids of the gonane and wherein R represents a lower alkyl and X represents an 11β-hydroxyl dienic steroid of the formula

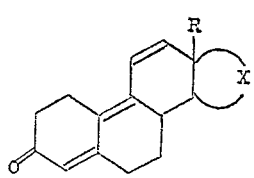

wherein R represents a lower alkyl and X represents an unsubstituted remainder of the pentagonal D cycle or a nonhydroxyl-substituted remainder of the pentagonal D cycle to the action of a concentrated acidic dehydrating agent at a temperature below room temperature and recovering said $\Delta^{4,9,11}$-trienic steroids. The invention also relates to the novel products produced thereby.

A certain number of trienic steroid products have been described already since 1962 whose structure is distinguished by the presence of double bonds in the 4(5), 9(10) and 11(12) position, conjugated with a ketone in the 3 position (see for example Velluz et al., C.R. of Acad. des Sciences, 257, pp. 569–570 (1963); Feyel-Cabanes, C.R. Soc. Biologie, CLVII, p. 1428 (1963); and in U.S. patent application Ser. No. 397,628, filed Sept. 18, 1964, now Patent No. 3,248,294). Until now, however, in order to gain access to these products, it was necessary to start with the intermediate from the total synthesis of the steroids, which had to be brominated and dehydrobrominated in the 11 position. This resulted in relatively laborious syntheses, necessitating several chromatographic separations in order to arrive at the desired products in the pure condition.

An object of the present invention is the development of a process for the production of a trienic steroid of the formula

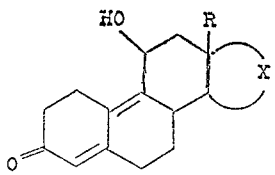

wherein R represents a lower alwyl and X represents a member selected from the group consisting of an unsubstituted remainder of the pentagonal D cycle and a non-hydroxyl-substituted remainder of the pentagonal D cycle which comprises the steps of subjecting an 11β-hydroxyl dienic steroid of the formula

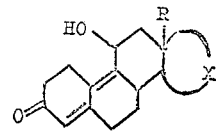

wherein R and X have the above-assigned values to the action of a dehydrating agent at a temperature below room temperature and recovering said trienic steroid.

A further object of the present invention is the obtention of the novel products:

$\Delta^{4,9,11}$-estratriene-3,17-dione
17β-dichloroacetoxy-$\Delta^{4,9,11}$-estratriene-3-one
17β-tert.-butylacetoxy-$\Delta^{4,9,11}$-estratriene-3-one
17-ethylenedioxy-$\Delta^{4,9,11}$-estratriene-3-one
17β-hexahydrobenzyloxycarbonyloxy-$\Delta^{4,9,11}$-estratriene-3-one
17β-tetrahydropyranyloxy-$\Delta^{4,9,11}$-estratriene-3-one
17β-trimethylacetoxy-$\Delta^{4,9,11}$-estratriene-3-one
17β-cyclopentylacetoxy-$\Delta^{4,9,11}$-estratriene-3-one
13β-ethyl-$\Delta^{4,9,11}$-gonatriene-3,17-dione
17β-acetoxy-13β-ethyl-$\Delta^{4,9,11}$-gonatriene-3-one
17β-benzolyloxy-13β-ethyl-$\Delta^{4,9,11}$-gonatriene-3-one
17β-phenylacetoxy-13β-ethyl-$\Delta^{4,9,11}$-gonatriene-3-one
13β-n-propyl-$\Delta^{4,9,11}$-gonatriene-3,17-dione
17β-acetoxy-13β-n-propyl-$\Delta^{4,9,11}$-gonatriene-3-one
17β-trimethylacetoxy-13β-n-propyl-$\Delta^{4,9,11}$-gonatriene-3-one
17β-benzoyloxy-13β-n-propyl-$\Delta^{4,9,11}$-gonatriene-3-one
17β-phenylacetory-13β-n-propyl-$\Delta^{4,9,11}$-gonatriene-3-one
13β-isopropyl-$\Delta^{4,9,11}$-gonatriene-3,17-dione
17β-acetory-13β-isopropyl-$\Delta^{4,9,11}$-gonatriene-3-one
17β - benzoyloxy - 13β-isopropyl-$\Delta^{4,9,11}$-gonatriene-3-one
3 - pyrrolidyl - 19-nor-$\Delta^{3,5(10),9(11)}$-pregnatriene-20-one
11β-hydroperoxy-19-nor-$\Delta^{4,9}$-pregnadiene-3,20-dione
19-nor-$\Delta^{4,9}$-pregnadiene-11β-ol-3,20-dione These and other objects of the invention will become more apparent as the description thereof proceeds.

In particular, the invention relates to a process of dehydration of the 11β-hydroxy-3-oxo-$\Delta^{4,9}$-steroids of the general Formula II given below which leads to the trienic structure desired without producing an aromatization of the A ring.

According to the invention, the process consists essenitally in that an 11β-hydroxyl dienic derivative of the general Formula II:

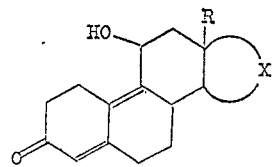

(II)

is subjected to the action of a dehydrating agent and particularly to the action of concentrated sulfuric acid to obtain the corresponding trienic compound of the general Formula I:

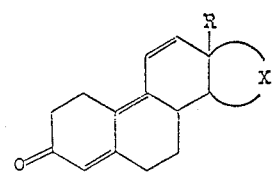

(I)

R representing in the preceding formulae a lower alkyl radical and, in particular, methyl, ethyl, propyl or isopropyl, and X represents the remainder of the pentagonal D cycle, substituted or unsubstituted, but not having any hydroxyl group substituents.

The dehydration reaction may be effected in the absence of any solvent. It may also be effected in an appropriate organic solvent, as for example, in ether.

The reaction is conducted below room temperature, preferably the reaction is conducted at a temperature of about $+10°$ C. to about $-10°$ C. and the best results occur at about $0°$ C.

The reaction is, as a rule, complete after a few minutes and the product formed is immediately isolated according to the customary methods. The process furnishes excellent yields and the pure products obtained are easily crystallizable.

Consequently the process according to the invention offers the advantage of avoiding the reactions of bromination and dehydrobromination, which are much more laborious, and, on the other hand, it allows the obtention of considerably more improved yields. Further advantages will become evident to those specializing in this field by reading the following.

The 11β-hydroxyl dienic products of Formula II which serve as starting materials in the present process may be prepared according to the process described in the U.S. patent application Ser. No. 373,048, filed June 5, 1964, now Patent No. 3,301,756.

According to this method, a 17β-acyloxy- or a 17-keto-13β-alkyl-4,5-seco-$\Delta^9$-gonene-3,5-dione is subjected to the action of the pyrrolidine to form the 3-pyrrolidino-17β-acyloxy or 17 - keto - 13β-alkyl-$\Delta^{3,5(10),9(11)}$-gonatriene, which is hydrolyzed in 17β-acyloxy- or 17-keto-13β-alkyl-$\Delta^{5(10),9(11)}$-gonadiene-3-one. This latter is converted into an 11β - hydroperoxy-17β-acyloxy- or 17-keto-13β-alkyl-$\Delta^{4,9}$-gonadiene-3-one by the action of oxygen in a slightly alkaline medium, and, finally, this latter is reduced to an 11β-hydroxyl compound by the action of a tri-lower-alkyl phosphite.

The following examples will serve for better comprehension of the invention without, however, limiting its characteristics.

EXAMPLE I

Preparation of $\Delta^{4,9,11}$-estratriene-3,17-dione 0.35 gm. of $\Delta^{4,9}$-estradiene-11β-ol-3,17-dione as introduced into 1.75 cc. of concentrated sulfuric acid cooled to about $0°$ C. and the reaction mixture was triturated for a period of 5 minutes.

Next, the mixture was poured into 17.5 cc. of ice water, allowed to stand for a few minutes at a low temperature and then extracted with methylene chloride. The organic phase was successively washed, first with water, then with a saturated solution of sodium bicarbonate and again with water. The organic phase was thereafter dried, filtered, and evaporated to dryness under vacuum. 0.313 gm. of $\Delta^{4,9,11}$-estratriene-3,17-dione as thus obtained having a melting point of 135–136° C.

The product occurred in the form of prismatic needles, insoluble in water, dilute aqueous acids and alkalis, and soluble in most of the common organic solvents with the exception of isopropyl ether.

This compound is not described in the literature and is endowed with an androgenic and anabolic activity.

EXAMPLE II

Preparation of $\Delta^{4,9,11}$-estratriene-3,17-dione

A sulfuric acid-ether mixture was prepared by introducing dropwise 40 cc. of anhydrous sulfuric ether into 100 cc. of concentrated sulfuric acid cooled to $0°$ C., and care was taken that the temperature of the mixture did not exceed $20°$ C. Next, 100 cc. of the mixture prepared as indicated above, were withdrawn and, under brisk agitation at temperature of about $0°$ C., 10 gm. of $\Delta^{4,9}$-estradiene-11β-ol-3,17-dione were introduced therein. The agitation was maintained for a period of 5 minutes further.

Then, the mixture was poured into ice water and extracted with methylene chloride. After washing first with water, then with a solution of sodium bicarbonate and again with water, the organic phase was dried, filtered and evaporated to dryness under vacuum.

The residue, recrystallized from sulfuric ether, yielded about 8.5 gm. of $\Delta^{4,9,11}$-estratriene-3,17-dione, having a melting point of 140° C., and a specific rotation $$[\alpha]_D^{20} = +220.4° \pm 2.5°$$

(c.=0.5% in chloroform).

The compound occurred in the form of prismatic needles, and was insoluble in water, in dilute aqueous acids and alkalis, and soluble in most of the common organic solvents with the exception of isopropyl ether.

Analysis.—$C_{18}H_{20}O_2$; molecular weight=268.34: Calculated: C, 80.56%; H, 7.51%. Found: C, 80.6; H, 7.3.

Ultra-violet spectra:

Max. 236 mμ $E_{1cm.}^{1\%} = 206$

Max. 338 mμ $E_{1cm.}^{1\%} = 1080$ ε 29,000

In an analogous manner and working in accordance with the process of the invention, it is possible to prepare other trienic compounds of general Formula I.

EXAMPLE III

Preparation of 17β-acetoxy-$\Delta^{4,9,11}$-estratriene-3-one

17β-acetoxy-$\Delta^{4,9}$-estradiene-11β-ol-3-one was subjected to dehydration according to the process described above, and 17β-acetoxy-$\Delta^{4,9,11}$-estratriene-3-one was obtained, having a melting point of 96–97° C., and a specific rotation $[\alpha]_D^{20} = +36.8°$ (c.=0.37% in methanol).

The compound possesses an androgenic and anabolic activity. It is identical to that described in commonly-assigned U.S. patent application Ser. No. 397,628, filed Sept. 18, 1964, now Patent No. 3,248,294.

EXAMPLE IV

Preparation of 17β-benzoyloxy-$\Delta^{4,9,11}$-estratriene-3-one

17β-benzoyloxy-$\Delta^{4,9}$-estradiene-11β-ol-3-one was subjected to dehydration according to the process described above and 17β-benzoyloxy-$\Delta^{4,9,11}$-estratriene-3-one was obtained, having a melting point of 154° C., and a specific rotation $[\alpha]_D^{20} = +117°$ (c.=0.47% in ethanol).

This compound possesses an androgenic and anabolic action. It is identical to that described in commonly-assigned U.S. patent application Ser. No. 397,628, filed Sept. 18, 1964, now Patent No. 3,248,294.

EXAMPLE V

Preparation of 13β-ethyl-$\Delta^{4,9,11}$-gonatriene-3,-17-dione

According to the process described above, 13β-ethyl-$\Delta^{4,9}$-gonadiene-11β-ol-3,17-dione was subjected to dehydration, and 13β-ethyl-$\Delta^{4,9,11}$-gonatriene-3,17-dione was obtained having a melting point of 145° C., and a specific rotation $[\alpha]_D^{20} = +202°$ (c.=0.54% in chloroform).

This compound may be utilized as an intermediate in steroid synthesis, particularly for the production of the corresponding 17 disubstituted compounds.

This compound is not described in the literature.

An example for the preparation of a corresponding 17-disubstituted compound is given hereinafter:

Preparation of 13β-ethyl-17α-methyl-$\Delta^{4,9,11}$-gonatriene-17β-ol-3-one

Stage A: 3-ethylenedioxy-13β-ethyl-$\Delta^{4,9,11}$-gonatriene-17-one 1,745 mg. of 13β-ethyl-$\Delta^{4,9,11}$-gonatriene-3,17-dione and 262 mg. of anhydrous oxalic acid were introduced into 8.7 cm.³ of glycol and 87 cm.³ of anhydrous 1,2-dichloro-ethane, and the whole was refluxed during a period of six hours. The condensed dichloroethane was dried upon a silica gel previous to its recycling. The solution was then cooled and was, next poured into a saturated aqueous sodium bicarbonate solution, whereafter it was extracted with methylene chloride.

The extracts were washed with water, dried, evaporated to dryness to obtain a residue which was subjected to chromatography through 70 g. aluminum oxide followed by eluation with a 1:1 benzene-cyclohexane mixture.

The eluate was evaporated to dryness. The dry residue, triturated with ether, yielded 1,051 mg. (i.e. a yield of 52%) of 3-ethylenedioxy-13β-ethyl-Δ$^{4,9,11}$-gonatriene-17-one, M.P. 150–151° C.

The compound appeared in the form of colorless needles which were soluble in benzene and chloroform, slightly soluble in alcohol and ether.

The infrared spectra (chloroform) showed up the presence of conjugated double bonds with a band at 6,18μ.

The ultra-violet spectra (ethanol):

$$\lambda \text{ max. } 302 \text{ m}\mu \quad E^{1\%}_{1\text{cm.}} = 930 \quad \epsilon = 30,000$$

The compound has not been described on the literature.

Stage B: 3 - ethylenedioxy - 13β-ethyl-17α-methyl-Δ$^{4,9,11}$-gonatriene-17β-ol 897.5 mg. of 3-ethylenedioxy-13β-ethyl-Δ$^{4,9,11}$-gonatriene-17-one were dissolved in 27.5 cm.$^3$ of anhydrous tetrahydrofuran. The solution was cooled to the temperature of +5° C., whereafter 11 cm.$^3$ of a 1.95 N ethereal methyl magnesium bromide solution were added to it over a period of five minutes, while stirring. Agitation was continued during sixty minutes, whereafter the solution was left at rest during twenty-four hours at the temperature of 0° C. It was then poured into an ice-cold saturated ammonium chloride solution and stirred for a while.

The solution was extracted with methylene chloride. The methylene chloride extracts were washed with water, dried and evaporated to dryness, to obtain 951 mg. of 3-ethylenedioxy - 13β - ethyl - 17α - methyl - Δ$^{4,9,11}$ - gonatriene-17β-ol, which was made use of without any further purification in the following stage of the synthesis.

The compound has not been described in the literature.

Stage C: 13β-ethyl-17α-methyl-Δ$^{4,9,11}$-gonatriene-17β-ol-3-one

The 951 mg. of 3-ethylenedioxy-13β-ethyl-17α-methyl-Δ$^{4,9,11}$-gonatriene-17β-ol, obtained in stage B, were dissolved in 95 cm.$^3$ of methanol, whereafter 9.5 cm.$^3$ of acetic acid and 5 cm.$^3$ of water were added, and the whole was then left at rest for an hour at room temperature.

It was then poured into water, neutralized by the addition of a sodium bicarbonate solution, extracted with methylene chloride. The methylene chloride extracts were washed with water, dried and evaporated to dryness in a vacuum. The residue thus obtained was subjected to chromatography through magnesium silicate followed by elution with methylene chloride which contained 6% of acetone.

The eluate was evaporated to dryness and the residue, repeatedly recrystallized first from a 1:1 benzene-cyclohexane mixture and then from ethyl acetate, yielded 13β-ethyl-17α-methyl-Δ$^{4,9,11}$-gonatriene-17β-ol-3-one, M.P. 154° C., rotatory power $[\alpha]_D^{20} = -41.9°$ (c.=0.7% ethanol).

The compound is soluble in alcohol, acetone, benzene and chloroform, slightly soluble in ether.

U.V. spectra (ethanol):

$$\lambda \text{ max. } 343 \text{ m}\mu \quad E^{1\%}_{1\text{cm.}} = 1030 \quad \epsilon = 30,730$$

Analysis.—$C_{20}H_{26}O_2$=298.41: Calculated: C, 80.49%; H, 8.78%. Found: C, 80.6%; H, 8.7%.

The compound is endowed with an androgenic and anabolizing action. It has not been described in the literature.

EXAMPLE VI

Preparation of 17β-dichloroacetoxy-Δ$^{4,9,11}$-estratriene-3-one

According to the process described above, 17β-dichloroacetoxy-Δ$^{4,9}$-estradiene-11β-ol-3-one was subjected to dehydration and 17β-dichloroacetoxy-Δ$^{4,9,11}$-estratriene-3-one was thus obtained, having a melting point of 103° C., and a specific rotation $[\alpha]_D^{20} = +32°$ (c.=0.9% in methanol).

This compound is endowed with androgenic and anabolisant activity.

This compound is not described in the literature.

17β - dichloroacetoxy - Δ$^{4,9,11}$ - estratriene-3-one is possessed of interesting pharmacological properties and possesses particularly an important anabolic and androgenic action. The compound may have utilization in therapy for warm-blooded animals for the treatment of disturbances of protidic anabolism, asthenia, thinness, for the treatment of andropause, for the treatment of senescence, for the treatment of osteoporosis, for the treatment of disturbances due to metabolic trouble caused by prolonged corticotherapy, for the treatment of adiposo-genital syndrome.

17β - dichloroacetoxy - Δ$^{4,9,11}$ - estratriene-3-one may be utilized orally, perlingually, transcutaneously or rectally. It can be prepared in the form of injectable solutions or suspensions, put up in ampules, in multipledose flacons, in solutions for transcutaneous usage in implants, in tablets, in coated tablets, in sublingual tablets and suppositories.

The useful dosolgy is controlled between 0.5 and 20 mg. per day per 70 kg. of body weight as a function of the method of administration.

The usual pharmaceutical forms such as injectable solutions and suspensions, solutions for transcutaneous utilization, implants, tablets, coated tablets, sublingual tablets and suppositories are prepared according to the usual processes.

EXAMPLE VII

Preparation of 17β-ter-butyl-acetoxy-Δ$^{4,9,11}$-estratriene-3-one

According to the process described above, 17β-ter-butyl-acetoxy-Δ$^{4,9}$-estradiene-11β-ol-3-one was subjected to dehydration and 17β-ter-butyl-acetoxy-Δ$^{4,9,11}$-estratriene-3-one was thus obtained having a melting point of 76° C., and a specific rotation $[\alpha]_D^{20} = +42°$ (c.=0.6% in methanol).

This compound exhibits an androgenic and anabolic activity.

This compound is not described in the literature.

EXAMPLE VIII

Preparation of 17-ethylenedioxy-Δ$^{4,9,11}$-estratriene-3-one

According to the process described above, 17-ethylenedioxy-Δ$^{4,9}$-estradiene-11β-ol-3-one was subjected to dehydration and 17-ethylenedioxy-Δ$^{4,9,11}$-estratriene-3-one was thus obtained having a melting point of 104° C., and a specific rotation $[\alpha]_D^{20} = +2.7°$ (c.=0.64% in chloroform).

This compound presents an androgenic and anabolic activity.

This compound is not described in the literature.

The starting compound, 17-ethylenedioxy-Δ$^{4,9}$-estradiene-11β-ol-3-one was prepared according to the following synthesis:

1 gm. of Δ$^{4,9}$-estradiene-11β-ol-3,17-dione were placed in suspension in 50 cc. of benzene and 0.21 gm. of ethylene glycol. Next, 115 mg. of anhydrous p-toluene sulfonic acid were added and the reaction mixture was quickly brought to boiling. The water formed was continuously eliminated by azeotropic distillation. After boiling the mixture for one-half hour, the solution was cooled and alkalized by the addition of an alcoholic solution of sodium hydroxide. The organic phase was decanted, washed with water to neutrality, dried, filtered and then evaporated to dryness under vacuum. The dry residue was taken up by heptane and subjected to chromatography through magnesium silicate. Next, the column was successively eluted, first with pure hexane, then with hexane containing increasing amounts of ether. The elution with hexane containing from 2 to 5% ether, furnished 17-ethylenedioxy-$\Delta^{4,9}$-estradiene-$11\beta$-ol-3-one.

This compound was characterized by its

Ultraviolet spectra: $\lambda$ max. 307 m$\mu$
Concentration of 3-keto-$\Delta^{4,9}$=>97%
Infrared spectra: presence of conjugated ketone grouping; presence of ketal group; absence of ketone in the 17 position.

EXAMPLE IX

Preparation of 19-nor-$\Delta^{4,9,11}$-pregnatriene-3,20-dione

At room temperature, a dehydrating mixture was prepared starting out with 100 cc. of concentrated sulfuric acid and 40 cc. of sulfuric ether.

6 gm. of 19-nor-$\Delta^{4,9}$-pregnadiene-$11\beta$-ol-3,20-dione were introduced into 60 cc. of the mixture prepared as described above, cooled to about 0° C. Thereafter, the mixture was agitated for about 10 minutes at a low temperature. Then it was poured into a water-ice mixture and agitated for one hour. The precipitate was vacuum filtered and washed with water. The product was triturated with a 5% aqueous solution of sodium bicarbonate, vacuum filtered, washed with water and dried under vacuum.

After recrystallization from isopropyl ether, 4.31 gm., representing a yield of 78.7%, of 19-nor-$\Delta^{4,9,11}$-pregnatriene-3,20-dione were obtained, having a melting point of 100° C., and a specific rotation $[\alpha]_D^{20} = +97.3° \pm 1.5°$ (c.=0.5% in methanol).

The product was slightly soluble in isopropyl ether, and soluble in alcohol, acetone, benzene, chloroform and in cold sulfuric ether.

*Analysis.*—$C_{20}H_{24}O_2$; molecular weight=296.39: Calculated: C, 81.04%; H, 8.16%. Found: C, 81.3%; H, 8.1%.

Ultraviolet spectra in ethanol: Max. 339 m$\mu$; $\epsilon$=28,750.

This compound possesses an important progestomimetic activity.

The starting 19-nor-$\Delta^{4,9}$-pregnadiene-$11\beta$-ol-3,20-dione was prepared in the following manner:

(A) 3-PYRROLIDYL-19-NOR-$\Delta^{3,5(10),9(11)}$-PREGNATRIENE-20-ONE

While operating in total absence of light and under agitation, 1 gm. of 19-nor-$\Delta^{4,9}$-pregnadiene-3,20-dione was introduced into 10 cc. of anhydrous methanol, then, after allowing nitrogen to bubble through the mixture for 10 minutes, 1 cc. of pyrrolidine was added thereto. The agitation was kept up for one hour under atmosphere of nitrogen at a temperature of about 20° C. Then, the reaction mixture was iced. The precipitate was vacuum filtered, washed with iced methanol and dried. 1.05 gm. of 3-pyrrolidyl - 19 - nor-$\Delta^{3,5(10),9(11)}$-pregnatriene-20-one was obtained, having a melting point of 172–173° C., and a specific rotation $[\alpha]_D^{20} = +388.3° \pm 3.5°$ (c.=0.5% in dimethylformamide) after an immediate reading.

The product occurred in the form of prisms, and was slightly soluble in alcohol and ether.

*Analysis.*—$C_{24}H_{33}ON$; molecular weight=351.51: Calculated: C, 82%; H, 9.46%; N, 3.98%. Found: C, 82%; H, 9.6%; N, 4.1%.

This compound is not described in the literature.

The starting product, 19-nor-$\Delta^{4,9}$-pregnadiene-3,20-dione may be obtained according to the process of Bucourt, Tessier and Nomine (Bull. Soc. Chim., 1963, p. 1923).

(B) 19-NOR-$\Delta^{5(10),9(11)}$-PREGNADIENE-3,20-DIONE

A solution of 174 cc. of acetic acid in 10 volumes of water was prepared. A stream of nitrogen was allowed to bubble through this solution, then 58 gm., of pulverulent 3-pyrrolidyl-19-nor-$\Delta^{3,5(10),9(11)}$-pregnatriene-20-one were introduced therein.

The reaction mixture was agitated over a period of 15 hours while nitrogen was bubbling through the mixture at room temperature. The reaction mixture was thereafter iced and vacuum filtered. The product was washed with water, dried under vacuum in the total absence of light, and, after recrystallization from ethanol, 39 gm. of 19-nor-$\Delta^{5(10),9(11)}$-pregnadiene - 3,20 - dione were obtained, having a melting point of 120° C., and a specific rotation $[\alpha]_D^{20} = +214.6° \pm 2.5°$ (c.=0.5% in methanol).

The product occurred in the form of prismatic needles, and was slightly soluble in alcohol and in cold ether, and soluble in acetone, benzene and chloroform.

*Analysis.*—$C_{20}H_{26}O_2$; molecular weight=298.41: Calculated: C, 80.49%; H, 8.78%. Found: C, 80.4%; H, 8.8%.

Ultraviolet spectra in ethanol: Max. 240 m$\mu$; $\epsilon$=19,650.

(C) $11\beta$-HYDROPEROXY-19-NOR-$\Delta^{4,9}$-PREGNADIENE-3,20-DIONE

Under agitation, 1.55 gm. of 19-nor-$\Delta^{5(10),9(11)}$-pregnadiene-3,20-dione was introduced into 8 cc. of ethanol containing 1% of triethylamine, and a stream of oxygen was allowed to bubble through the mixture for a period of 3 hours at room temperature.

Next the reaction mixture was iced to a temperature of −10° C., under agitation and atmosphere of nitrogen. The product was vacuum filtered, washed with ethanol and dried. 1.085 gm. of $11\beta$-hydroperoxy-19-nor-$\Delta^{4,9}$-pregnadiene - 3,20 - dione were obtained after recrystallization from methanol, having a melting point of 196° C., and a specific rotation $[\alpha]_D^{20} = +116.7° \pm 1.5°$ (c.=0.5% in methanol).

The product occurred in the form of colorless prisms, and was slightly soluble in ether and soluble in hot alcohol.

*Analysis.*—$C_{20}H_{26}O_4$ molecular weight=330.4: Calculated: C, 72.69%; H, 7.93%. Found: C, 72.7%; H, 8.

Ultra-violet spectra in ethanol: Max. 295 m$\mu$; $\epsilon$=20,400.

This compound is not described in the literature.

(D) 19-NOR-$\Delta^{4,9}$-PREGNADIENE-$11\beta$-OL-3,20-DIONE 1.1 gm. of $11\beta$-hydroperoxy-19-nor-$\Delta^{4,9}$-pregnadiene-3,20-dione were introduced into 5.5 cc. of methanol, then, dropwise, at room temeprature and under agitation, 0.55 cc. of trimethyl phosphite was added thereto.

The mixture was kept for about 10 minutes at a temperature of about 45° C., then it was cooled to room temperature and allowed to stand for 30 minutes and finally poured into a mixture of ice water and hydrogen peroxide. Next, the mixture was agitated for one hour. The product was vacuum filtered, washed with water, dried in an oven at a temperature of 80° C., and recrystallized from ethyl acetate.

In this way 0.75 gm. of 19-nor-$\Delta^{4,9}$-pregnadiene-$11\beta$-ol-3,20-dione were obtained, having a melting point of 198° C., and a specific rotation $[\alpha]_D^{20} = +104.9° \pm 1.5°$ (c.=0.5% in methanol).

The product occurred in the form of colorless prisms, and was insoluble in ether and water, slightly soluble in cold methanol, and soluble in chloroform and in hot ethyl acetate.

*Analysis.*—$C_{20}H_{26}O_3$; molecular weight=314.41: Calculated: C, 76.39%; H, 8.33%. Found: C, 76.1%; H, 8.3%.

Ultra-violet spectra in ethanol: Max. 297 m$\mu$; $\epsilon$=20,100.

This compound is not described in the literature.

It is obvious, however, that the process of the invention applies with the same facility to the preparation of other trienic derivatives. Thus, it is possible, for example, by dehydration of the corresponding $11\beta$-hydroxy-$\Delta^{4,9}$- steroids according to the new process, that the following products may be obtained:

17β-trimethylacetoxy-Δ$^{4,9,11}$-estratriene-3-one;
17β-cyclopentylacetoxy-Δ$^{4,9,11}$-estratriene-3-one;
17β-acetoxy-13β-ethyl-Δ$^{4,9,11}$-gonatriene-3-one;
17β-benzoyloxy-13β-ethyl-Δ$^{4,9,11}$-gonatriene-3-one;
17β-phenylacetoxy-13β-ethyl-Δ$^{4,9,11}$-gonatriene-3-one;
13β-propyl-Δ$^{4,9,11}$-gonatriene-3,17-dione;
17β-acetoxy-13β-propyl-Δ$^{4,9,11}$-gonatriene-3-one;
17β-trimethylacetoxy-13β-propyl-Δ$^{4,9,11}$-gonatriene-3-one;
17β-benzoyloxy-13β-propyl-Δ$^{4,9,11}$-gonatriene-3-one;
17β-phenylacetoxy-13β-propyl-Δ$^{4,9,11}$-gonatriene-3-one;
13β-isopropyl-Δ$^{4,9,11}$-gonatriene-3,17-dione;
17β-acetoxy-13β-isopropyl-Δ$^{4,9,11}$-gonatriene-3-one;
17β-benzoyloxy-13β-isopropyl-Δ$^{4,9,11}$-gonatriene-3-one;
17β-hexahydrobenzyloxycarbonyloxy-Δ$^{4,9,11}$-estratriene-3-one;
17β-tetrahydropyranyloxy-Δ$^{4,9,11}$-estratriene-3-one.

All of these compounds possess an androgenic and an anabolisant activity in animals.

The preceding specific embodiments are illustrative of the invention. It is to be understood however that other expedients known to those skilled in the art may be employed without departing from the spirit of the invention or the scope of the appended claims.

We claim:

1. A process for the production of a trienic steroid of the formula

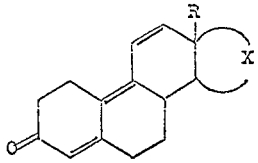

wherein R represents a lower alkyl and X represents a member selected from the group consisting of an unsubstituted remainder of the pentagonal D cycle and a non-hydroxyl-substituted remainder of the pentagonal D cycle which comprises the steps of subjecting an 11β-hydroxyl dienic steroid of the formula

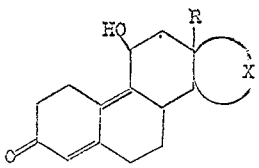

wherein R and X have the above-assigned values to the action of a concentrated sulfuric acid dehydrating agent at a temperature below room temperature and recovering said trienic steroid.

2. A process for the production of a trienic steroid of the formula

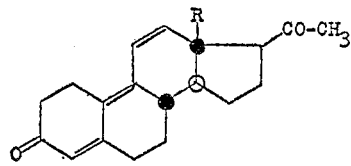

wherein R represents a lower alkyl, which comprises the steps of subjecting an 11β-hydroxy-Δ$^{4,9}$-dienic steroid of the formula

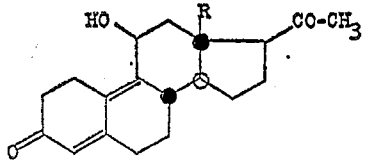

wherein R has the above-assigned values to the action of a concentrated sulfuric acid dehydrating agent at a temperature below room temperature and recovering said trienic steroid.

3. A process for the production of an 11β-hydroxy-Δ$^{4,9}$-dienic steroid of the formula

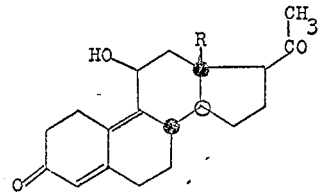

wherein R represents lower alkyl which comprises the steps of reacting 19-nor-Δ$^{5(10),9(11)}$-pregnadiene-3,20-dione with oxygen in the presence of a weakly alkaline media in an inert organic solvent, reducing the compound of the formula

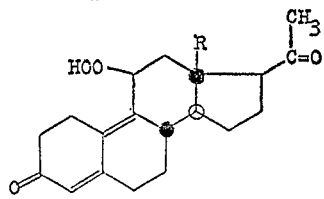

wherein R has the above-assigned valve by the action of a tri-lower-alkyl phosphite in an inert organic solvent, and recovering said 11β-hydroxy-Δ$^{4,9}$-dienic steroid.

4. The process of claim 3 wherein said oxidation is effected in the presence of an amine compound selected from the group consisting of tri-lower-alkyl-amines, tertiary cyclic amines, and organic acid derivatives of quaternary ammonium compounds, as said weakly alkaline media.

5. The process of claim 3 wherein said oxidation is effected in the presence of an inert organic solvent selected from the group consisting of lower alkanols, N,N-di-lower-alkyl-lower-alkanoyl-amides and mixtures thereof.

6. Δ$^{4,9,11}$-estratriene-3,17-dione.

7. 17β-hexahydrobenzyloxycarbonyloxy-Δ$^{4,9,11}$-estratriene-3-one.

8. 17β-tetrahydropyranyloxy-Δ$^{4,9,11}$-estratriene-3-one.

9. 13β-ethyl-Δ$^{4,9,11}$-gonatriene-3,17-dione.

10. 13β-n-propyl-Δ$^{4,9,11}$-gonatriene-3,17-dione.

11. 3-pyrrolidyl-19-nor-Δ$^{3,5(10),9(11)}$ - pregnatriene - 20-one.

12. 11β-hydroperoxy-19-nor-Δ$^{4,9}$ - pregnadiene - 3,20-dione.

13. 3-ethylenedioxy 13β-ethyl-Δ$^{4,9,11}$-gonatriene-17-one.

14. 3-ethylenedioxy 13β-ethyl-17α-methyl Δ$^{4,9,11}$-gonatriene-17β-ol.

15. The Δ$^{4,9,11}$-gonatriene-3-ones of the formula

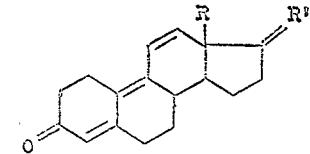

wherein R represents a lower alkyl and R' represents a member selected from the group consisting of oxygen and ethylenedioxy.

References Cited

UNITED STATES PATENTS 3,086,027  4/1963  Perelman et al. ____ 260—397.3
3,248,294  4/1966  Nomine et al. _____ 167—74

HENRY A. FRENCH, *Primary Examiner.*

U.S. Cl. X.R.

260—239.55, 397.3, 397.45, 999